July 8, 1947.　　　B. SHMURAK ET AL　　　2,423,523
PULSE DIRECTION FINDER SYSTEM
Filed Dec. 30, 1943　　　3 Sheets-Sheet 2
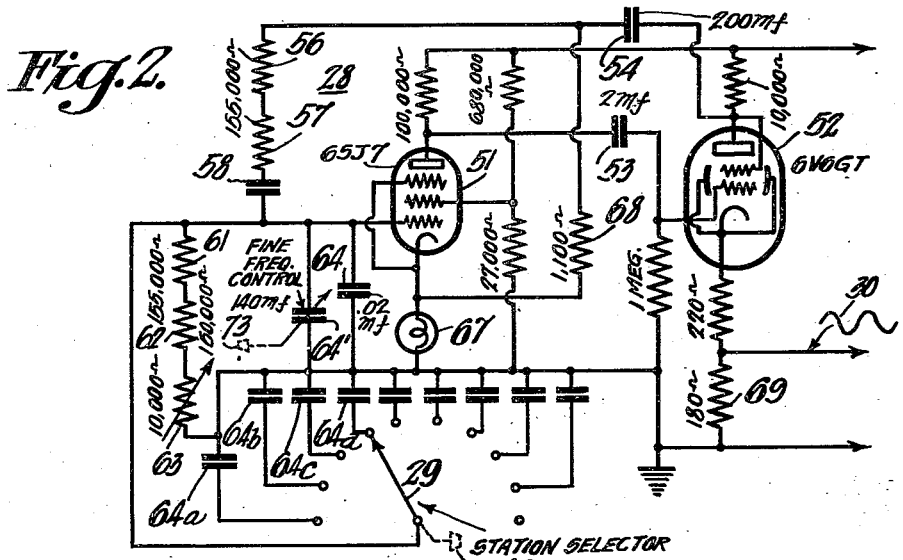
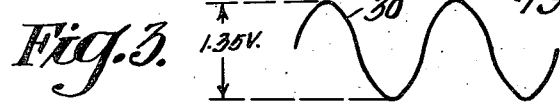
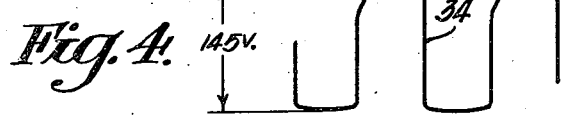
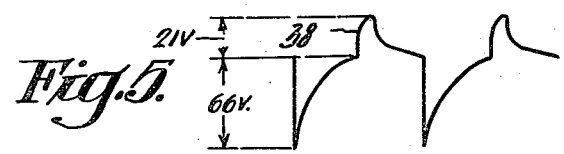
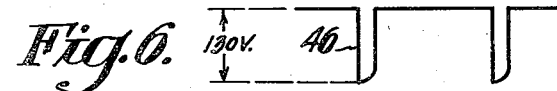
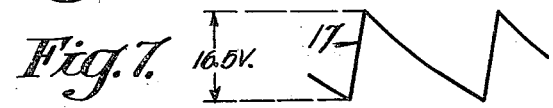
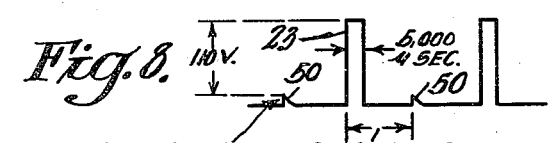
INVENTORS.
*Benjamen Shmurak*
BY *& George D. Hulst, Jr.*
ATTORNEY

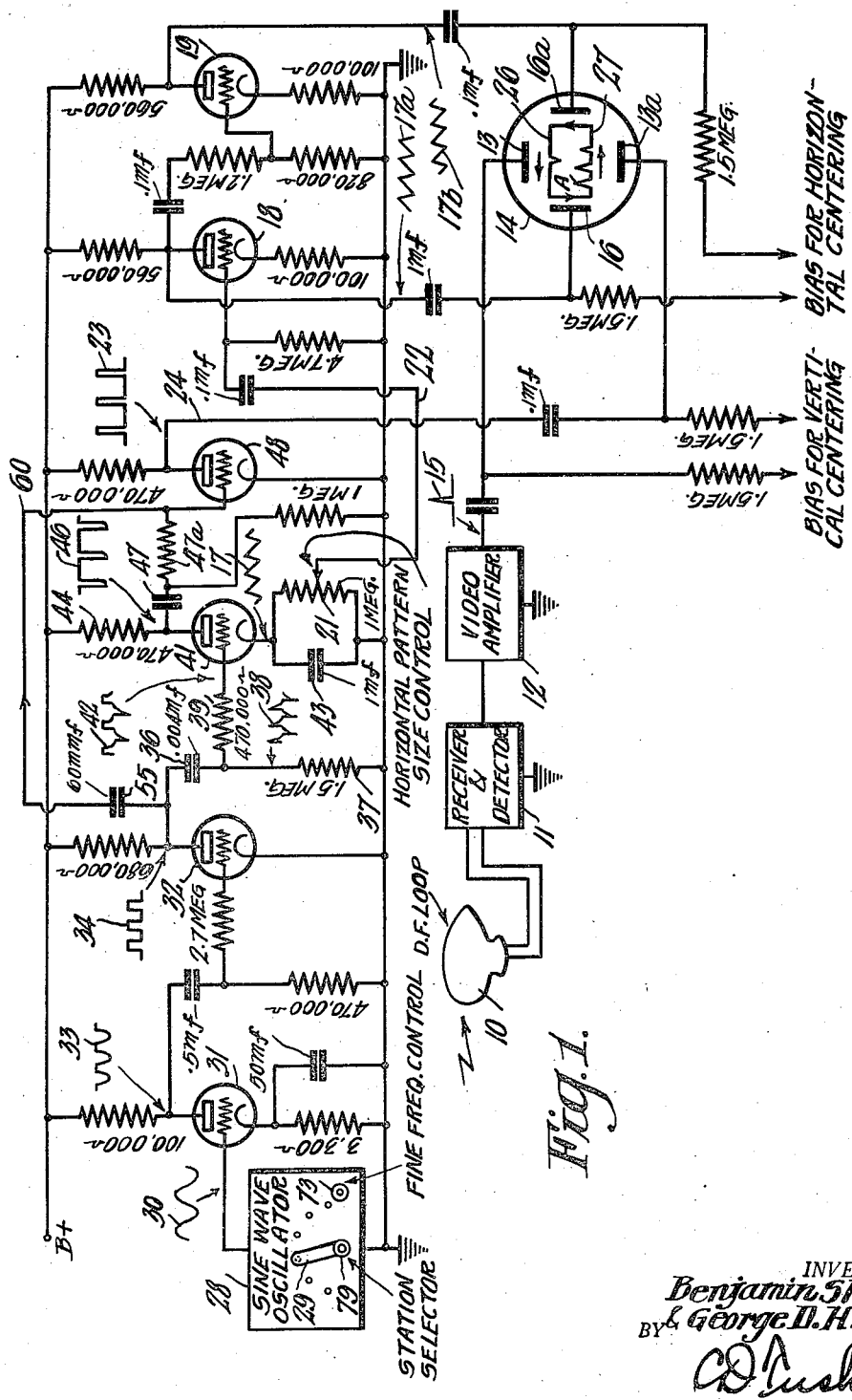

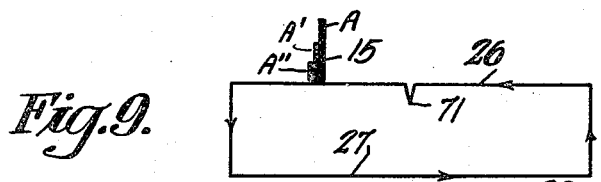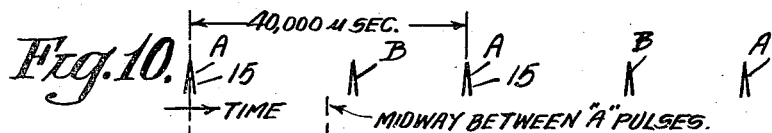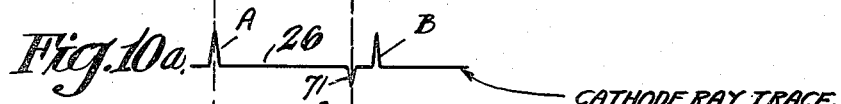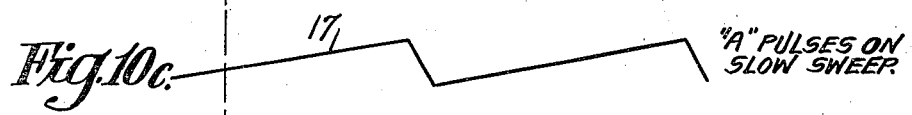

UNITED STATES PATENT OFFICE 2,423,523

PULSE DIRECTION FINDER SYSTEM

Benjamin Shmurak, Forest Hills, N. Y., and George D. Hulst, Jr., Upper Montclair, N. J., assignors to Radio Corporation of America, a corporation of Delaware Application December 30, 1943, Serial No. 516,196

4 Claims. (Cl. 250—11)

Our invention relates to receiver apparatus for identifying radio pulses and particularly to apparatus for use in radio pulse direction finder systems.

A disadvantage of direction finders of the usual type that obtain a bearing from a radio broadcast station or the like which transmits a continuous carrier wave is that, due to reflections, the carrier wave may travel several different paths in reaching the direction finder receiver. In systems of this type, it is difficult, if not impossible, to distinguish the carrier wave that arrived by the most direct path from those that have arrived over paths that do not represent the true direction.

A radio pulse direction finder, on the other hand, may be designed to give separate indications of the direct pulse and the reflected pulses whereby the loop antenna or other directive receiving antenna may be rotated to the null position for the direct pulse.

Our invention will be described by way of example as applied to a pulse direction finder receiver designed to obtain a bearing from any one of a group of radio pulse transmitters of a radio navigation system. In this particular navigation system the transmitters are in groups of two, the two stations being identified as the "A" station and the "B" station and the pulses which are transmitted therefrom being identified as the "A" pulses and "B" pulses, respectively. The A and B stations of one group transmit pulses at the same repetition frequency. The A and B stations of another group transmit pulses at a second and different repetition frequency, this second repetition frequency also being the same for the A station as for the B station. All transmitter stations operate on the same carrier frequency.

An object of the present invention is to provide an improved receiver circuit for distinguishing a pulse that has been transmitted over one path from a pulse that has been transmitted over a different path.

A further object of the invention is to provide a direction finder having an improved deflecting circuit for the cathode ray pulse indicator tube.

A further object of the invention is to provide in a direction finder, a simplified cathode ray deflecting circuit for producing both a slow sweep and a fast sweep of the cathode ray.

A still further object of the invention is to provide an improved means for identifying either one of two stations that are operating on the same carrier wave and which are transmitting radio pulses that occur at the same repetition rate.

In practicing one preferred embodiment of the invention, a loop antenna picks up the radio pulses from a transmitter station and supplies them through a suitable receiver and amplifier to the vertical deflecting plates of a cathode ray indicator tube. The horizontal deflecting plates of the cathode ray tube have a sawtooth voltage wave applied thereto which is made to recur at the repetition rate of the incoming pulses whereby the pulses are caused to appear stationary on either a slow or a fast cathode ray trace.

A comparatively slow sweep is required for ease of locating the pulses on the sweep whereas a fast sweep is required for good separation of pulses arriving by different paths. The two sweeps are provided as follows. The sawtooth deflecting wave is given the usual wave form whereby it has a fast return-line portion. During the occurrence of this return-line portion, a rectangular voltage pulse of the same duration as that of the said portion is applied to the vertical deflecting plates to displace the fast "return-line" trace with respect to the slow trace. In the example illustrated, the fast trace appears below the slow trace.

In operation, the sawtooth or sweep frequency is first adjusted to make the pulses appear on the slow sweep trace. Then the pulses are allowed to "drift" onto the fast sweep trace, the "drift" being due to the fact that the sawtooth frequency is not made exactly synchronous with the pulse repetition rate. When the pulses appear on the fast sweep, the sawtooth frequency is made exactly synchronous with the pulse frequency whereby the direct pulse and the echo pulses are stationary and, due to the fast sweep, are well spaced so that the desired pulse may be observed while obtaining a null for indicating direction in the conventional manner.

The invention will be better understood from the following description taken in connection with the accompanying drawing in which Figure 1 is a circuit diagram of one embodiment of our invention, Figure 2 is a circuit diagram of an oscillator that may be employed in the circuit of Fig. 1, Figures 3 through 8 are graphs that are referred to in explaining the invention, Figure 9 is a view illustrating the slow and fast traces of the cathode ray indicator tube employed in the apparatus of Fig. 1, the received pulses being shown as appearing on the slow trace, Figure 9a is a view corresponding to Fig. 9 but for the condition where the pulses have been drifted onto the fast sweep trace, and Figures 10 to 10d are other graphs that are referred to in explaining the invention.

In the several figures, similar parts and graphs are indicated by similar reference characters.

Referring to Fig. 1 the radio pulses from a transmitter are picked up by a loop antenna in a streamline housing 10 and supplied to a receiver and detector unit 11 and to a video frequency amplifier 12. The pulses 15 appearing in the video frequency amplifier output are applied to one of the vertical deflecting plates 13 and 13a of a cathode ray indicator tube 14.

The horizontal deflecting plates 16 and 16a are supplied with sawtooth voltages indicated at 17a and 17b from amplifier tubes 18 and 19, respectively, which amplify the sawtooth voltage 17 appearing across a potentiometer resistor 21 to which an input lead 22 is connected. It will be noted that the tube 19 reverses the polarity of the sawtooth wave 17. Suitable centering biases are supplied to the cathode ray tube deflecting plates through 1.5 megohm resistors as indicated.

Rectangular pulses indicated at 23 are supplied over a conductor 24 to the vertical deflecting plate 13a for separating the slow sweep trace 26 from the fast sweep trace 27.

The circuit for producing the sawtooth wave 17 and the rectangular pulses 23 will now be described. A sine wave oscillator 28, which may be switched to different frequency settings by means of a switch 29, applies a sine wave voltage 30 to a pair of vacuum tubes 31 and 32 connected in cascade and adjusted to clip the sine wave successively, thus producing the voltage pulses 33 and 34.

The pulses 34 produce a current flow through a differentiating circuit comprising a capacitor 36 and a resistor 37 to produce the voltage wave 38 across resistor 37. The time relations of the waves 30, 34 and 38 are shown in Figs. 3, 4 and 5. The voltage 38 is applied through a resistor 39 to the grid of a vacuum tube 41 with sufficient amplitude to drive the grid positive whereby the voltage 38 is clipped and appears on the grid as shown at 42 with flat-topped portions. In the present example, each flat portion is 5000 microseconds long, this being the duration of the desired fast sweep.

The cathode circuit of the tube 41 includes a capacitor 43 which is shunted by the resistor potentiometer 21. Voltage is applied to the anode of tube 41 through an anode resistor 44. During each positive flat-topped portion of the wave 42 there is anode current flow through the tube 41 which charges the capacitor 43 whereby the steep portion of the sawtooth wave 17 (Fig. 7) is produced. Following the flat-topped portion the capacitor 43 discharges through the resistor 21 whereby the gradual sloping portion of the sawtooth wave 17 is produced. As previously described, the wave 17 is amplified and applied to the horizontal deflecting plates 16 and 16a.

During each 5000 μ second charging period of capacitor 43, a 5000 μ second pulse appears at the anode of tube 41 as indicated at 46. The pulses 46 are applied through a coupling capacitor 47 and a resistor 47a to a clipping tube 48 whereby the rectangular pulses 23 are obtained. As previously explained, the pulses 23 are applied to a vertical deflecting plate to separate the slow and fast traces. Center marking pulses 50 (Fig. 8) are also supplied to a vertical deflecting plate. The pulses 50 are obtained by passing the pulses 34, appearing at the anode of the tube 32, through a small capacitor 55 and over a conductor 60 to the grid of tube 48. The capacitor 55 is small enough to differentiate the pulses 34. The pulses corresponding to the back edges of pulses 34 are mixed with the pulses 23 as shown in Fig. 8. The time relations of the voltage waves 46, 17 and 23 with respect to each other and with respect to the differentiated wave 38 are shown in Figs. 6, 7 and 8.

The sine wave oscillator 28 in the example being described is of the resistor-capacitor type which is specially designed to obtain unusually good frequency stability. Referring to Fig. 2, the oscillator 28 comprises a first vacuum tube 51 which is coupled to a second vacuum tube 52 through a coupling capacitor 53. The anode of the tube 52 is coupled back to the input circuit of the tube 51 to provide regenerative feedback through a coupling capacitor 54 and through a frequency selective network which comprises resistors 56 and 57 and a capacitor 58 connected in series with each other and also connected in series with resistors 61, 62, 63 which are shunted by a capacitor 64 and a small adjustable capacitor 64'. Additional capacitors 64a, 64b, etc., of different values may be connected in parallel with capacitors 64 and 64' by means of the switch 29 to make the oscillator operate at any one of a plurality of predetermined frequencies.

The cathode lead of the tube 51 may include a tungsten filament lamp 67 or any similar means for stabilizing or controlling the amplitude of oscillations by negative feedback. The negative feedback connection also includes a resistor 68 connected from the coupling capacitor 54 to the junction point of the lamp 67 and the cathode of the tube 51. The output of the oscillator 28 is taken off a resistor 69 in the cathode lead of the tube 52.

It will be noted that the second tube 52 is connected to function as a triode although a pentode normally is used. It was found that the use of a triode in the circuit as illustrated improved the frequency stability by a very large amount.

The operation of the system will now be more fully described with reference to Figs. 9 to 10a. Fig. 9 shows the slow and fast cathode ray traces, 26 and 27, respectively, where the A pulses indicated at 15 from the A transmitter station together with two echo pulses A' and A'' appear on the slow trace 26. Fig. 9a is similar to Fig. 9 but shows the pulses A, A' and A'' on the fast trace 27 where they are well separated. The procedure is first to adjust the sine wave oscillator 28 until the pulses appear on the slow trace 26 and then to let them "drift" around until they appear on the fast trace 27 where they are held stationary by properly adjusting the frequency of oscillator 28.

It is, of course, necessary to know which transmitter of the several pairs of A and B stations is being received. Since the pairs of stations transmit at different pulse repetition rates, a particular pair of stations is identified by that position of the station selecting switch 29 on the oscillator 28 which makes the pulses either stand still or drift slowly on one of the cathode ray traces 26 or 27. Then the station of the known pair of A and B stations is identified by holding a pulse at the left end of the cathode ray trace 26 as shown in Figs. 10a and 10b. If, as in Fig. 10a, the second pulse on the trace is at the right of the center mark 71 (produced by pulse 50) it is the pulse B from the B station; if, as in Fig. 10b, it is at the left of mark 71, it is the pulse A from the A station. The reason for this will be apparent by comparing Figs. 10a and 10b with Fig. 10 where the sequence of transmission of the A and B pulses is illustrated. Since the B pulse occurs a little later than midway between successive A pulses, the above described identification is possible. After the pulse has been identified and held stationary on the fast trace 27, the receiver loop 10 is turned to the position that reduces the amplitude of the identified pulse to a minimum.

Figs. 10c and 10d illustrate how the pulses are caused to appear on either the slow trace or the fast trace as desired. After the correct station selection has been made by means of the switch 29 (which has a control knob 79), the oscillator frequency may be changed slightly by turning the fine adjustment knob 73 which varies the capacity of the small capacitor 64'. Thus, the phase relation of the sawtooth wave 17 with respect to the pulses is allowed to change (whereby the pulses appear to "drift" on the trace) until the pulses occur either during the slow sweep or during the fast sweep as desired, these two phase relations being shown in Figs. 10c and 10d, respectively. The oscillator frequency is then adjusted by the knob 73 to exact synchronism with the pulse frequency whereby the pulses remain stationary on the desired trace. Thereafter the loop is adjusted to obtain a null which indicates the direction of the transmitter, or more exactly, the wave front of the radio wave from the transmitter.

We claim as our invention:

1. Receiving apparatus for receiving radio pulses, said apparatus comprising a pulse receiver, a cathode ray indicator tube having a horizontal deflecting means and a vertical deflecting means, means for producing a sawtooth deflecting wave which may be made to recur in synchronism with the received pulses, said sawtooth wave having a gradually sloping portion and a steep return-line portion, means for applying said sawtooth wave to said horizontal deflecting means, means for producing periodically recurring electrical pulses each of substantially the same duration as one of said sawtooth wave portions and occurring simultaneously therewith, means for applying said last pulses to said vertical deflecting means whereby the fast cathode-ray trace produced by said return-line portion and the slow trace produced by said gradually sloping portion are separated, means for producing an indication on one of said cathode-ray traces in response to the reception of a pulse, and means for adjusting the relative phase of said sawtooth wave and the received pulses whereby the pulse indication may be made to occur on either the slow trace or the fast return-line trace as desired.

2. In a pulse direction finder system, means including a directive antenna for receiving radio pulses transmitted from a known transmitter station, a cathode ray indicator tube having a horizontal deflecting means and a vertical deflecting means, means for producing a sawtooth deflecting wave which may be made to recur in synchronism with the received pulses, said sawtooth wave having a gradually sloping portion and a steep return-line portion, means for applying said sawtooth wave to said horizontal deflecting means, means for producing periodically recurring electrical pulses each of substantially the same duration as said return-line portion and occurring simultaneously therewith, means for applying said last pulses to said vertical deflecting means whereby the fast cathode-ray trace produced by said return-line portion is separated from the slow trace produced by said gradually sloping portion, means for producing an indication on one of said cathode-ray traces in response to the reception of a pulse, and means for adjusting the phase of said sawtooth wave with respect to the received pulses whereby the pulse indication may be made to occur on either the slow trace or the fast return-line trace as desired.

3. In a pulse direction finder system, means including a directive antenna for receiving radio pulses transmitted from a known transmitter station, a cathode ray indicator tube having a horizontal deflecting means and a vertical deflecting means, means for producing a sawtooth deflecting wave which may be made to recur in synchronism with the received pulses, said sawtooth wave having a gradually sloping portion and a steep return-line portion, means for applying said sawtooth wave to said horizontal deflecting means, means for producing periodically recurring electrical pulses each of substantially the same duration as said return-line portion and occurring simultaneously therewith, means for applying said last pulses to said vertical deflecting means whereby the fast cathode-ray trace produced by said return-line portion is separated from the slow trace produced by said gradually sloping portion, means for producing an indication on one of said cathode-ray traces in response to the reception of a pulse, means for adjusting the phase of said sawtooth wave with respect to the received pulses whereby the pulse indication may be made to occur on either the slow trace or the fast return-line trace as desired, and means for producing a center mark indication on said slow trace at its midpoint.

4. In a pulse direction finder system, means including a directive antenna for receiving radio pulses transmitted from a known transmitter station, a cathode ray indicator tube having a pair of horizontal deflecting plates and a pair of vertical deflecting plates, means for producing a sawtooth deflecting wave which may be made to recur in synchronism with the received pulses, said sawtooth wave having a gradually sloping portion and a steep return-line portion, means for applying said sawtooth wave to said horizontal deflecting means, means for producing periodically recurring electrical pulses each of substantially the same duration as said return-line portion and occurring simultaneously therewith, means for applying said last pulses to one of said vertical deflecting plates whereby the fast cathode-ray trace produced by said return-line portion is separated from the slow trace produced by said gradually sloping portion, means for applying the received pulses to the other vertical deflecting plate to produce an indication on one of said cathode-ray traces in response to the reception of a pulse, and means for adjusting the phase of said sawtooth wave with respect to the received pulses whereby the pulse indication may be made to occur on either the slow trace or the fast return-line trace as desired.

BENJAMIN SHMURAK.
GEORGE D. HULST, Jr.